May 18, 1937. H. F. PATTERSON 2,080,740
BRAKING DEVICE
Original Filed April 18, 1934
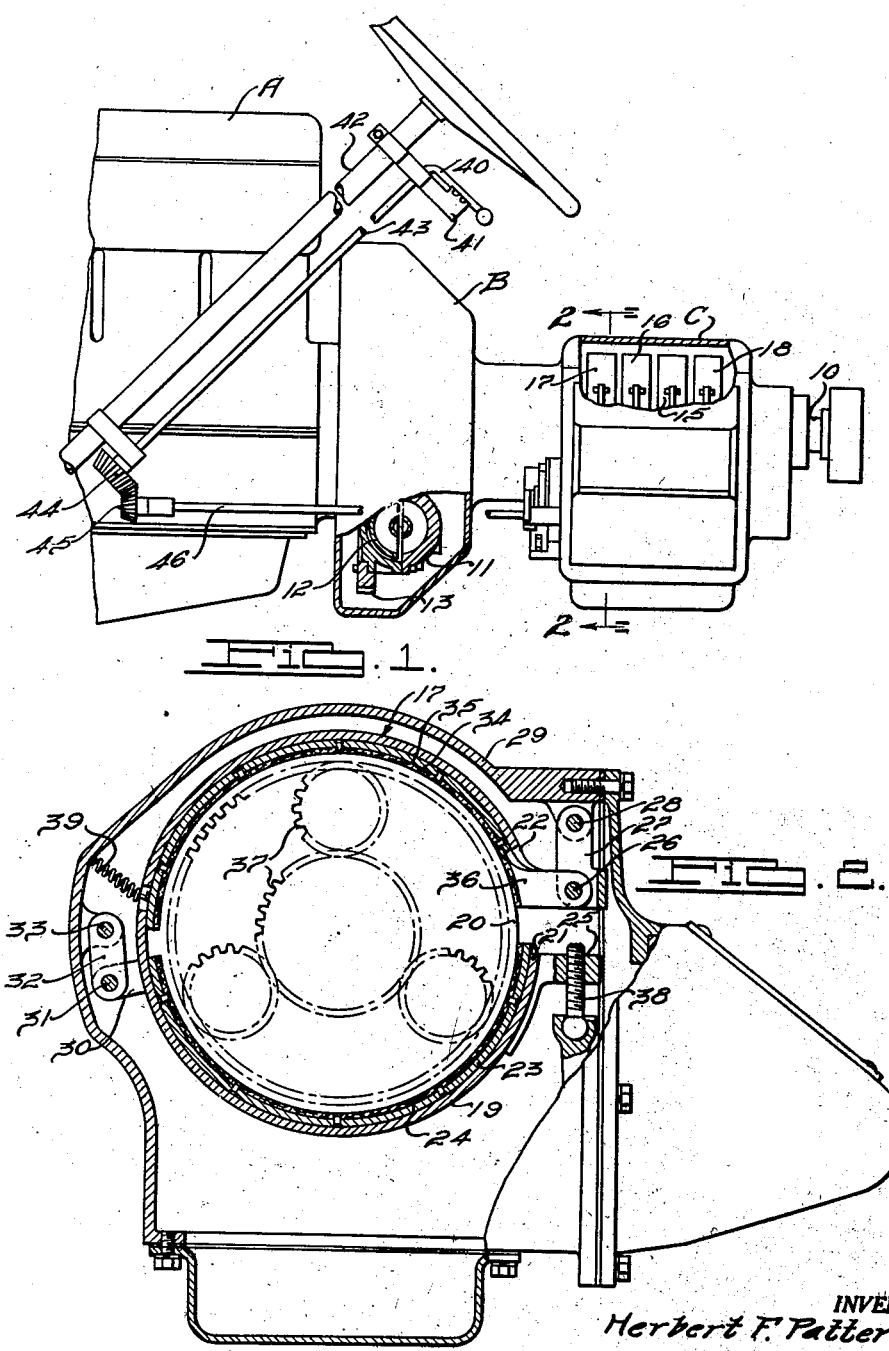
INVENTOR.
Herbert F. Patterson.
BY
ATTORNEYS Patented May 18, 1937

2,080,740

UNITED STATES PATENT OFFICE 2,080,740

BRAKING DEVICE

Herbert F. Patterson, Detroit, Mich., assignor to Chrysler Corporation, Highland Park, Mich., a corporation of Delaware Original application April 18, 1934, Serial No. 721,108. Divided and this application May 2, 1935, Serial No. 19,344. In Great Britain January 10, 1935

8 Claims. (Cl. 188—77)

This invention relates to power transmission devices and more particularly to a braking mechanism for power transmissions of the type including the well-known epicyclic or planetary transmission gear box, and is a division of my copending application Serial No. 721,108, filed April 18, 1934.

In the planetary type transmission it is customary to arrange the gearing to provide for the desired number of speed ratios between the engine and vehicle driving ground wheels and such gearing is customarily selected and controlled to obtain the desired driving speed ratio by actuation of any one of a group of transmission gearing controlling clutches usually consisting of reaction brake bands associated with and controlling the rotation of corresponding drums or similar elements of the various planetary gear trains.

An object of my invention resides in the provision of improvements in the braking means for establishing the reactionary rotary control for one or more of the gear sets of a planetary type transmission. While my invention is not necessarily limited in the application thereof to planetary transmissions, it has particular significance when applied to the rotary controlling elements of such transmissions since my invention provides for improved distribution of braking effect to the rotary drums. Difficulty has been experienced in planetary transmissions in connection with objectionable tendency toward displacement of the axis of the rotary drum when the braking effect is applied thereto to obtain a driving ratio through the gear box. My invention tends to remove such difficulties by providing a braking mechanism adapted to substantially balance the braking forces circumferentially around the drum without the aforesaid tendency toward objectionable displacement of the drum axis.

A further object of my invention resides in the provision of braking means having improved efficiency, especially in connection with drums of planetary transmissions; the braking means being further improved from the standpoints of simplicity, ease of service for making repairs, and ability to assemble and operate the braking mechanism within the limited space ordinarily available in gear boxes of the types referred to.

Further objects and advantages of my invention will be apparent from the following detailed description of one illustrative embodiment of the principles thereof, reference being had to the accompanying drawing, in which:

Fig. 1 is a side elevational view illustrating the power transmission mechanism as a whole, portions of the transmission and clutch casings being broken away.

Fig. 2 is a sectional elevational view through the transmission illustrating one of the planetary transmission speed ratio brake controlling devices, the section being taken along the line 2—2 of Fig. 1.

Referring to the drawing, I have illustrated the invention in connection with a motor vehicle drive, the latter including a prime mover or engine A, a portion of which is shown in Fig. 1, a clutch B driven from the engine, and a change speed transmission or gear box C driven from the clutch B. The drive passes from the transmission through a power take-off shaft 10 which, as usual, may extend rearwardly of the vehicle to drive the usual rear ground wheels, not shown.

The clutch B in the present illustration is of the fluid type and has the usual driving and driven cooperating vane members 11 and 12 respectively. The driving vane member 11 is carried by the engine flywheel 13 and the driven vane member 12 is secured to a suitable power shaft, not shown.

The change speed transmission C is of the epicyclic or planetary type and includes a plurality of transmission speed ratio controlling clutches or brakes 15, 16, 17 and 18, these braking devices being respectively adapted to actuate the transmission in its first speed ratio or low gear, second speed ratio or intermediate gear, third speed ratio, and reverse drive.

The typical brake device 17 illustrated in Fig. 2 consists of an outer band 19 which is somewhat flexible and which extends substantially circumferentially of a drum 20 so as to position the ends 21 and 22 thereof adjacent each other. This band 19 encloses a flexible segmental shoe 23 freely movable therewithin, the segmental shoe preferably extending substantially half way around the drum 20 from the end 21 of the band, this segmental shoe having attached thereto a suitable friction braking material 24 for braking engagement with the drum 20. The end 21 of the band 19 is provided with a threaded actuating flange 25 and the end 22 is flanged to receive an anchor pin 26 carried by a link 27 pivotally supported at 28 to the housing 29 of the transmission C. The shoe 23 is anchored by a flange 30 pivoted at 31 with a link 32, the latter being pivotally supported at 33 with the aforesaid casing 29 of the transmission.

Located within the band 19 and also relatively movable therewithin, I have provided a second segmental flexible shoe 34 having attached thereto the brake lining material 35 engageable with the drum 20, the shoe 34 having one end thereof provided with an anchoring flange 36 engaged by the aforesaid pin 26. The other end of the substantially semi-circular shoe 34 lies within the band 19 and adjacent to the anchored end of the first said segmental shoe 23, as illustrated in Fig. 2.

In Fig. 2 the third speed ratio braking device 17 is illustrated in its actuating position wherein the drum 20 is held against rotation, the driven shaft 10 in such instance being operated through the planetary gearing 37 somewhat diagrammatically illustrated in Fig. 2 in association with the drum 20. It will be readily understood that, according to well-known practice, when the drum 20 is released the planetary gearing 37 will cause rotation of the drum 20 and the driven shaft 10 will no longer be operated in the third speed ratio under control of the braking device 17. When the operating flange 25 of the band 19 is forced upwardly as viewed in Fig. 2 by actuation of the finger 38 by the band operating mechanism more particularly described in the aforesaid copending application, the band 19 is contracted so as to cause the brake linings 24 ant 35 of the shoes 23 and 34 respectively to engage the drum 20 and hold the drum against rotation. By reason of the arrangement of the segmental shoes and the anchoring provided therefor, the braking forces applied to the drum will be substantially balanced against a tendency toward transverse loading of the drum and hence the planetary gears associated therewith.

On release of the braking force applied to the band 19, the inherent resiliency of the band and shoes 23 and 34 will separate the brake linings from the drum, although, if desired, one or more springs 39 may be suitably arranged to assist this releasing action.

The manually controlled selector mechanism for the transmission C is particularly described in my aforesaid copending application and is controlled by a manual selector arm 40 cooperating with a notched segment 41 mounted on the steering post column 42. The arm 40 has a shaft 43 extending downwardly along the column 42, the lower end of the shaft having fixed thereto a bevel gear 44 meshing with a gear 45 attached to a rearwardly extending rod 46 cooperating with the transmission C.

Various changes, including the size, shape and arrangement of parts, may be made without departing from the spirit of my invention, and it is not my intention to limit the same other than by the terms of the appended claims.

What I claim is:

1. In a braking mechanism having a housing, a rotatable drum, a band substantially surrounding said drum, a plurality of circumferentially spaced shoes separate from said band and lying therewithin for frictional contact with said drum, means for anchoring the non-adjacent ends of said shoes to said housing, and brake applying means acting on said band independently of said shoes for contracting said band to cause said shoes to engage said drum substantially uniformly throughout the circumferential lengths of said shoes.

2. In a braking mechanism, a rotatable drum, a band substantially surrounding said drum, a plurality of circumferentially spaced shoes separate from said band and lying therewithin for frictional contact with said drum, common means for anchoring one end of said band and one end of one of said shoes, means for anchoring the remaining of said plurality of shoes, and means for contracting said band.

3. In a braking mechanism, a rotatable drum, a band surrounding said drum, a plurality of circumferentially spaced shoes separate from said band and lying therewithin for frictional contact with said drum, means for anchoring said shoes at substantially diametrically spaced locations, means for anchoring one end of said band, and means for actuating the other end of said band.

4. In a braking mechanism having a housing, a rotatable drum within said housing, a band substantially surrounding said drum, a plurality of circumferentially spaced shoes separate from said band and lying therewithin for frictional contact with said drum, means for pivotally anchoring said shoes to said housing at substantially diametrically spaced locations, means for anchoring one end of said band to said housing, and means for actuating the other end of said band.

5. In a braking mechanism having a housing, a rotatable drum within said housing, a band substantially surrounding said drum and having an end thereof pivotally anchored to said housing, a plurality of circumferentially spaced shoes movable relative to said band and adapted for frictional contact with said drum by contraction of said band, the non-adjacent ends of said shoes being pivotally anchored to said housing, and means for actuating the other end of said band for contracting the same.

6. In a braking mechanism having a housing, a rotatable drum, a band substantially surrounding said drum, a plurality of circumferentially spaced shoes separate from said band and lying therewithin for frictional contact with said drum, one of said shoes and said band having adjacently disposed radially extending portions respectively, common means for anchoring said portions to said housing, means for anchoring the other of said plurality of shoes to said housing, and means for actuating the other end of said band.

7. In a braking mechanism, a rotatable drum, a band surrounding said drum, a plurality of circumferentially spaced shoes separate from said band and lying therewithin for frictional contact with said drum, means for anchoring said shoes at substantially diametrically spaced locations, and brake applying means acting on said band independently of said shoes for contracting said band to bring said shoes into frictional engagement with said drum substantially uniformly throughout the circumferential lengths of said shoes.

8. In a braking mechanism, a rotatable drum, a flexible band surrounding said drum, a plurality of circumferentially spaced shoes separate from said band and lying therewithin for frictional contact with said drum, circumferentially and symmetrically spaced anchoring means for said shoes, and brake applying means acting on said band independently of said shoes for contracting said band to cause said shoes to engage said drum substantially uniformly throughout the circumferential length of said shoes.

HERBERT F. PATTERSON.